(12) United States Patent
Guo

(10) Patent No.: US 10,678,847 B2
(45) Date of Patent: Jun. 9, 2020

(54) METHOD AND DEVICE FOR SEARCHING A TARGET IN AN IMAGE

(71) Applicant: Hangzhou Hikvision Digital Technology Co., Ltd., Zhejiang (CN)

(72) Inventor: Jietian Guo, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 219 days.

(21) Appl. No.: 15/746,073

(22) PCT Filed: Dec. 29, 2015

(86) PCT No.: PCT/CN2015/099592
§ 371 (c)(1),
(2) Date: Jan. 19, 2018

(87) PCT Pub. No.: WO2017/012277
PCT Pub. Date: Jan. 26, 2017

(65) Prior Publication Data
US 2018/0210896 A1    Jul. 26, 2018

(30) Foreign Application Priority Data
Jul. 22, 2015 (CN) .......................... 2015 1 0435106

(51) Int. Cl.
| | | |
|---|---|---|
| *G06F 16/583* | (2019.01) | |
| *G06F 16/51* | (2019.01) | |
| *G06F 16/28* | (2019.01) | |
| *G06F 16/22* | (2019.01) | |
| *G06F 16/00* | (2019.01) | |
| *G06N 20/00* | (2019.01) | |
| *G06F 16/2457* | (2019.01) | |

(52) U.S. Cl.
CPC .......... *G06F 16/5838* (2019.01); *G06F 16/00* (2019.01); *G06F 16/2246* (2019.01);
(Continued)

(58) Field of Classification Search
CPC ................. G06F 16/00; G06F 16/5838; G06F 16/24578; G06F 16/285; G06F 16/2246; G06F 16/51; G06N 20/00
See application file for complete search history.

(56) References Cited

U.S. PATENT DOCUMENTS

| | | | | |
|---|---|---|---|---|
| 6,505,205 B1 * | 1/2003 | Kothuri | ................... | G06F 16/54 715/840 |
| 8,429,173 B1 * | 4/2013 | Rosenberg | .......... | G06F 16/5866 707/748 |

(Continued)

FOREIGN PATENT DOCUMENTS

| | | |
|---|---|---|
| CN | 1331451 A | 1/2002 |
| CN | 103714122 A | 4/2004 |

(Continued)

OTHER PUBLICATIONS

International Search Report dated Apr. 20, 2016, from International Application No. PCT/CN2015/099592, 5 pages.

(Continued)

*Primary Examiner* — Jay A Morrison
*Assistant Examiner* — Ken Hoang
(74) *Attorney, Agent, or Firm* — Meunier Carlin & Curfman LLC

(57) ABSTRACT

The present application discloses a method and a device for searching a target in an image. The search method includes: locating a target in an image to be searched (S101); classifying the target and extracting a local feature of the target to generate a local feature code of the local feature (S102); searching an image database for suspected images of the same classification as the target through a tree classification index structure, comparing pre-stored local feature codes of the suspected images with the local feature code of the target, and outputting a suspected image with a similarity larger than a first threshold (S103). By locating a target in an (Continued)

image to be searched, performing at least two levels of classification on the target, generating local feature code of the target, and searching according to the classification of the target when searching and sorting by similarity, thus the target to be searched is model-matched within the same target classification, enhancing the searching accuracy and efficiency.

13 Claims, 5 Drawing Sheets

(52) U.S. Cl.
CPC ...... *G06F 16/24578* (2019.01); *G06F 16/285* (2019.01); *G06F 16/51* (2019.01); *G06N 20/00* (2019.01)

(56) References Cited

U.S. PATENT DOCUMENTS

| | | | | |
|---|---|---|---|---|
| 2009/0141984 | A1* | 6/2009 | Nakamura | G06K 9/6211 382/201 |
| 2011/0085739 | A1* | 4/2011 | Zhang | G06F 16/58 382/218 |
| 2016/0104058 | A1* | 4/2016 | He | G06K 9/6255 382/156 |

FOREIGN PATENT DOCUMENTS

| | | | |
|---|---|---|---|
| CN | 102368237 A | | 3/2012 |
| CN | 103258190 A | | 8/2013 |
| CN | 103617420 A | | 3/2014 |
| EP | 1168195 A2 | | 1/2002 |
| JP | 2014123220 A | * | 7/2014 |

OTHER PUBLICATIONS

Extended European Search Report issued for European Application No. 15898833.7, dated Jan. 8, 2019, 9 pages.

Liu, et al., In Defense of Soft-assignment Coding, 2011 IEEEE Int Conference on Computer Vision, 2486-2493.

Yin, et al., Review of Deep Learning, Journal of Beijing Univ of Technology, 41(1), 2015, 12 pages. English Abstract included in text.

Li Xiuzhi, Research on Large-scale Image Retrieval Technology Using Sparse Representation, 2014, 82 pages. English Abstract included in text.

\* cited by examiner

METHOD AND DEVICE FOR SEARCHING A TARGET IN AN IMAGE

The present application is a 371 of International Application Number PCT/CN2015/099592, filed Dec. 29, 2015, which claims priority to Chinese patent application No. 201510435106.9, filed with State Intellectual Property Office of People's Republic of China on Jul. 22, 2015 and entitled "Method and device for searching a target in an image", each of which are incorporated herein by reference in their entirety.

TECHNICAL FIELD

The application relates to the field of graphic images, and particularly to a method and device for searching a target in an image.

BACKGROUND

In the prior art, when searching for pictures, it is generally, from a technical aspect, to process gray scale images of a target to extract local description of the images (SIFT, SURF), and calculate the distance or similarity between features of target images using a method such as Bag of Visual Words (BOW), Hamming Embedding, Locality Sensitive Hash Method. These methods ignore global features of the same importance such as color, shape, texture, target type, resulting the color, shape, texture, target type of the searched result are very different from that of a queried target.

From the point of view of searching, comparing targets in a monitored scene one by one without distinguishing different target types lacks pertinence and wastes resources. Specifically, images to be searched and images in an image database are not classified according to target types, it is necessary to compare a target contained in an image to be searched with a target contained in each image in an image database when searching pictures in the prior art. However, different types of targets in a monitored scene are actually quite different, whereas this difference is not utilized when searching pictures in the prior art. Thus, comparing targets one by one without distinguishing different target types in the prior art lacks pertinence, and the efficiency of searching target in an image using a one-by-one comparison method is not high.

SUMMARY

The present application provides a method and a device for searching a target in an image, by locating a target in an image to be searched, performing at least two levels of classification on the target, generating a local feature code of the target, and searching according to the classification of the target when searching and sorting by similarity; by classifying the target, the searched target is model-matched in the same target classification, enhancing the searching accuracy and efficiency.

To achieve this purpose, the present application provides the following technical solutions.

In one aspect, a method for searching a target in an image is provided, wherein the method includes:
  locating a target in an image to be searched;
  classifying the target and extracting a local feature of the target to generate a local feature code of the local feature;
  searching an image database for suspected images of the same classification as the target through a tree classification index structure, comparing pre-stored local feature codes of the suspected images with the local feature code of the target, and outputting a suspected image with a similarity larger than a first threshold.

In another aspect, a device for searching a target in an image is provided, wherein the device includes:
  a target obtaining unit, configured for locating a target in an image to be searched;
  a classifying and coding unit, configured for classifying the target and extracting a local feature of the target to generate a local feature code of the local feature;
  a comparing unit, configured for searching an image database for suspected images of the same classification as the target through a tree classification index structure, comparing pre-stored local feature codes of the suspected images with the local feature code of the target, and outputting a suspected image with a similarity larger than a first threshold.

To achieve the above purposes, embodiments of the present application further provide a storage medium, the storage medium is used to store an application program, the application program is used to implement the method for searching a target in an image described above when being executed.

To achieve the above purposes, embodiments of the present application further provide an application program; the application program is used to implement the method for searching a target in an image when being executed.

To achieve the above purposes, embodiments of the present application further provide an image searching apparatus, including a processor, a communication interface, a memory and a communication bus; wherein,
  the processor, the memory and the communication interface are connected and communicated with each other via the bus;
  the memory stores executable program code;
  the processor executes a program corresponding to the executable program code by reading the executable program code stored in the memory, for:
  locating a target in an image to be searched;
  classifying the target and extracting a local feature of the target to generate a local feature code of the local feature;
  searching an image database for suspected images of the same classification as the target through a tree classification index structure, comparing pre-stored local feature codes of the suspected images with the local feature code of the target, and outputting a suspected image with a similarity larger than a first threshold.

The beneficial effects of the present application are as follows: by locating a target in an image to be searched, performing at least two levels of classification on the target, generating a local feature code of the target, and searching according to the classification of the target when searching and sorting by similarity; by classifying the target, the searched target is model-matched in the same target classification, enhancing the searching accuracy and efficiency.

BRIEF DESCRIPTION OF THE DRAWINGS

In order to describe the embodiments of the present application and the technical solutions in the prior art more clearly, drawings required for embodiments of the present application and the prior art will be described briefly below. It is obvious that the drawings below are for only some embodiments of the present application and those skilled in the art can also obtain other drawings based on these drawings without any creative efforts.

DETAILED DESCRIPTION

In order to make the purposes, technical solutions as well as advantages of the present application more apparent and understandable, the present application will be described in more detail below with reference to the accompanying drawings and embodiments. Obviously, the described embodiments are only some of the embodiments of the present application, not all of the embodiments. All other embodiments obtained based on the embodiments of the present application by those skilled in the art without any creative work fall into the protection scope defined by the present application.

Figure 1:
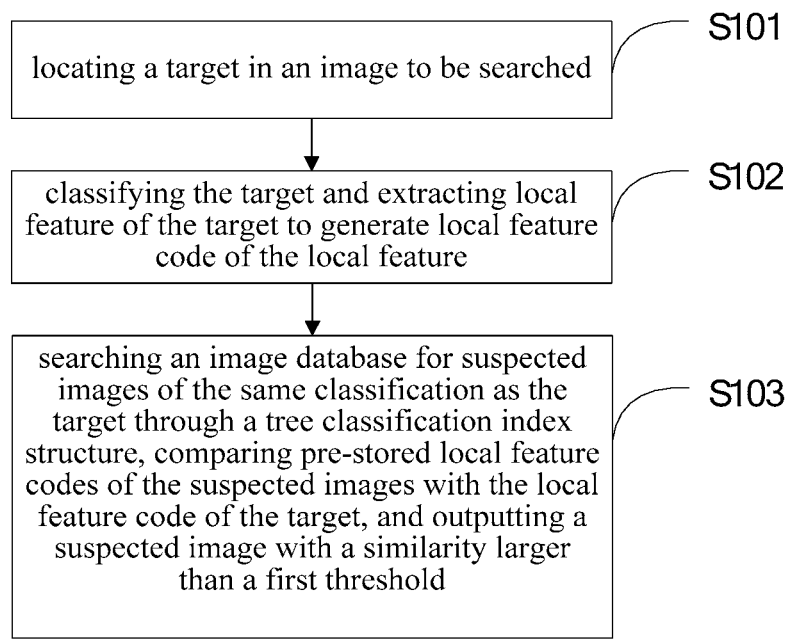
FIG. 1 is a flowchart of a first embodiment of a method for searching a target in an image provided in the detailed description of the present application.

Refer to FIG. 1, which is a flowchart of a first embodiment of a method for searching a target in an image provided in the detailed description of the present application. As shown, the searching method includes:

Step S101: locating a target in an image to be searched.

Locating a target and obtaining target area images can be accomplished by target detection methods, such as LBP (Local Binary Patterns), HOG (Histogram of Oriented Gradient), DPM (Deformable Parts Model), in combination with a saliency detection method, the aforementioned methods have been realized in the prior art and will not be further described here.

Step S102: classifying the target and extracting a local feature of the target to generate a local feature code of the local feature.

In the prior art, when search a specific target in an image, all the targets are in one set, i.e., there is only one level of classification, and each classification is equated to one kind of target. In the present scheme, there is at least one level of classification for each target, such as human, car, bike etc . . . .

Step S103: searching an image database for suspected images of the same classification as the target through a tree classification index structure, comparing pre-stored local feature codes of the suspected images with the local feature code of the target, and outputting a suspected image with a similarity larger than a first threshold.

Because the target has been classified, it is only needed to directly determine the classification of the target to be searched and search in the corresponding classification of the target during searching, which reduces the amount of searching operations. Besides, it is only needed to search in the same classification through a model of the same type.

In summary, by locating a target in an image to be searched, performing at least two levels of classification on the target, generating a local feature code of the target, and searching according to the classification of the target when searching and sorting by similarity; by classifying the target, the searched target is model-matched in the same target classification, enhancing the searching accuracy and efficiency.

Figure 2:
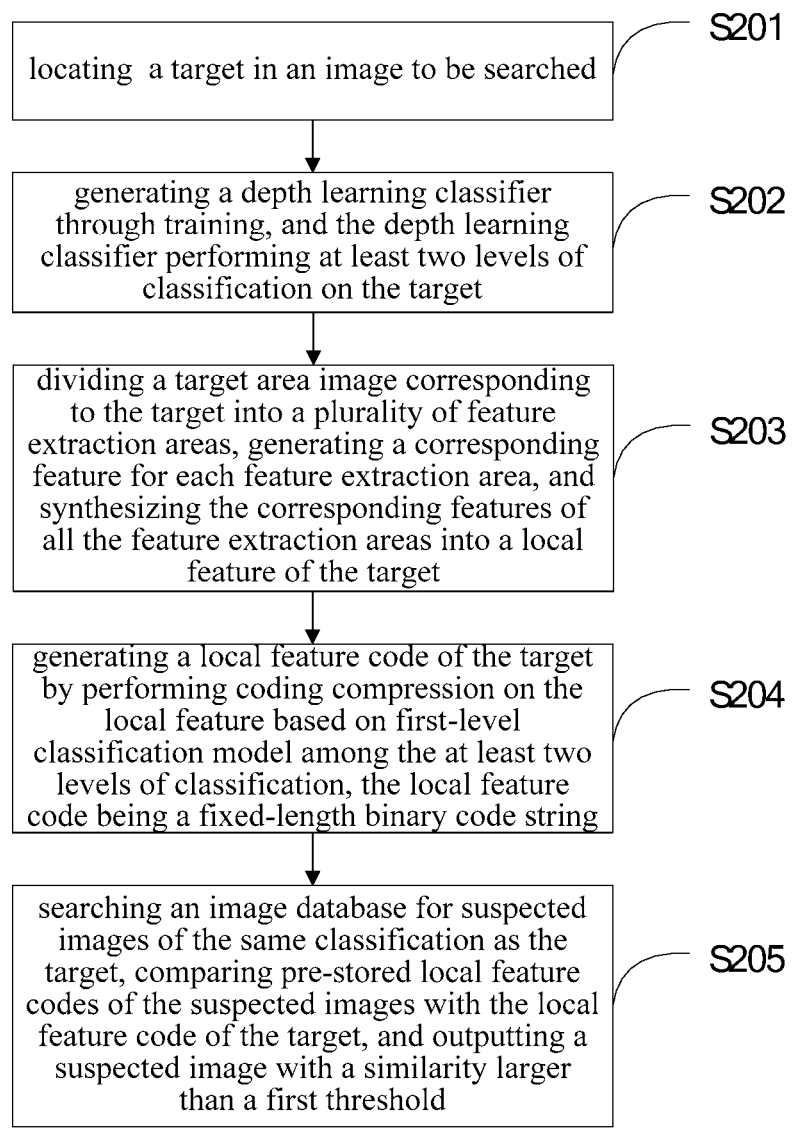
FIG. 2 is a flowchart of a second embodiment of a method for searching a target in an image provided in the detailed description of the present application.

Refer to FIG. 2, which is a flowchart of a second embodiment of a method for searching a target in an image provided in the detailed description of the present application. As shown, the searching method includes:

Step S201: locating a target in an image to be searched.

Step S202: generating a deep learning classifier through training, wherein the deep learning classifier performing at least two levels of classification on the target.

Identifying target type of an input target image, generating a deep learning classifier through training by using a deep learning classification algorithm in machine learning, the deep learning classifier can identify a broad type of the target, such as humans, cars, bicycles, electrical bicycles. For each broad type, it can be further classified, such as according to vehicle brand, cloth type and gender of human.

In practical applications, the classification of a target in an image to be searched can be done by using a classifier based on a deep learning algorithm that has been previously trained.

Step S203: dividing a target area image corresponding to the target into a plurality of feature extraction areas, generating a corresponding feature for each feature extraction area, and synthesizing the corresponding features of all the feature extraction areas into a local feature of the target.

Step S204: generating a local feature code of the target by performing coding compression on the local feature based on first-level classification model among the at least two levels of classification, the local feature code being a fixed-length binary code string.

Step S205: searching an image database for suspected images of the same classification as the target, comparing pre-stored local feature codes of the suspected images with the local feature code of the target, and outputting a suspected image with a similarity larger than a first threshold.

During searching, more than one target whose image similarity is relatively high may be detected; in this case, sorting can be performed according to image similarity for manual judgment.

In summary, by locating a target in an image to be searched, performing at least two levels of classification on the target, generating a local feature code of the target, and searching according to the classification of the target when searching and sorting by similarity; by classifying the target, the searched target is model-matched in the same target classification, enhancing the searching accuracy and efficiency.

In practical applications, the embodiment of the method as shown in FIG. 2 can be simplified in the following steps when a deep learning classifier is pre-established:

(1). locating a target in an image to be searched;

(2). performing at least two levels of classification on the target using the pre-established deep learning classifier;

(3). dividing a target area image corresponding to the target into a plurality of feature extraction areas, generating a corresponding feature for each feature extraction area, and synthesizing the corresponding features of all the feature extraction areas into a local feature of the target;

(4). generating a local feature code of the target by performing coding compression on the local feature based on first-level classification model among the at least two levels of classification, the local feature code being a fixed-length binary code string.

(5). searching an image database for suspected images of the same classification as the target through a tree classification index structure, comparing pre-stored local feature codes of the suspected images with the local feature code of the target, and outputting a suspected image with a similarity larger than a first threshold.

Figure 3:
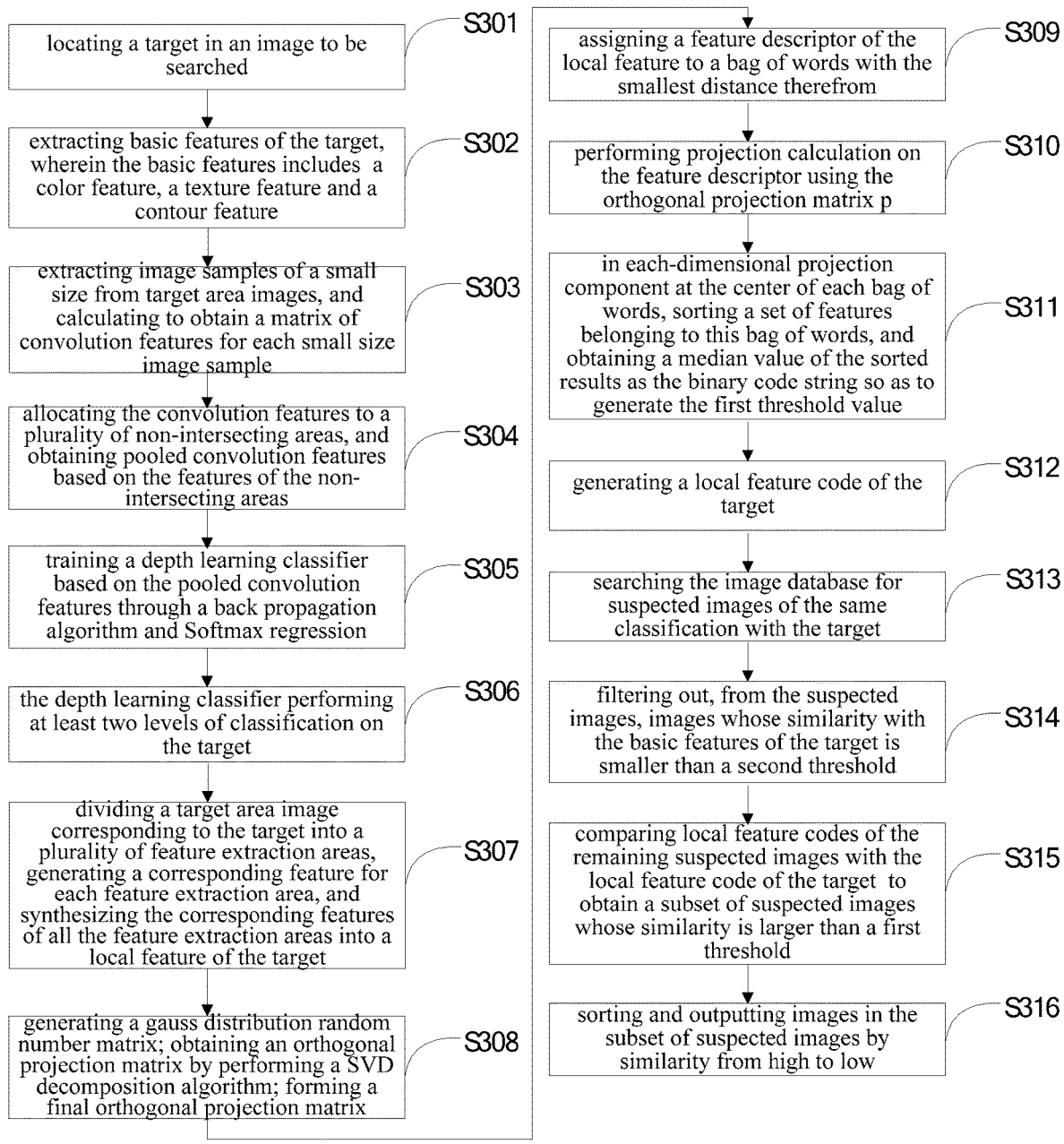
FIG. 3 is a flowchart of a third embodiment of a method for searching a target in an image provided in the detailed description of the present application.

Refer to FIG. 3, which is a flowchart of a third embodiment of a method for searching a target in an image provided in the detailed description of the present application. As shown, the searching method includes:

Step S301: locating a target in an image to be searched.

Step S302: extracting basic features of the target, wherein the basic features includes a color feature, a texture feature and a contour feature.

A color feature is extracted for each target area image inputted, the extraction method of color feature is to obtain by training a convolutional neural network between RGB pixels of an image to 14 primary colors (black, blue, brown, gray, green, cyan, orange, pink, purple, purplish red, red, white, silvery white, yellow) using a deep learning method, the training method is identical to the target type network training method. RGB triples of each image will be mapped to 14 primary colors according to probability to obtain a confidence histogram, and all the confidence histograms of a target area are averaged:

$$\vec{M} = \Sigma_x \Sigma_y (\vec{C}) / \text{patch\_size}$$

Counter shapes include but are not limited to the degree of rectangularity, roundness, invariant moments, Fourier descriptors of contours.

Step S303: extracting image samples $x_s$ of a small size $a \times b$ from target area images of the target, and calculating a corresponding value $f_s = \sigma(W^{(1)} x_s + b^{(1)})$ for each image sample of a small size image sample, performing convolution on all $f_s$ to obtain a matrix of $k \times (r-a+1) \times (c-b+1)$ convolution features.

Under the teaching of visual system structure in biology, i.e., neurons in a visual cortex only accept partial information and only respond to the stimulation from certain specific areas, the scheme adopts an architecture of a partially communicated network. That is to say, the connection between a hidden unit and an input unit is limited: each hidden unit can be only connected to a part of the input unit. For example, each hidden unit is only connected to a small adjacent area of the input image.

Assuming an image of a large size $r \times c$ is given, which is defined as $x_1$. Firstly, image samples $x_s$ of a small size $a \times b$ are extracted from images of a large size. Sparse self-coding is trained and k numbers of features are obtained by calculating $f = \sigma(W^{(1)} x_s + b^{(1)})$ ($\sigma$ is a sigmod type function), wherein, $W^{(1)}$ and $b^{(1)}$ are the weight and deviation between a visual layer unit and a hidden unit. The corresponding value $f_s = \sigma(W^{(1)} x_s + b^{(1)})$ is calculated for each small image $x_s$ of a size $a \times b$, and performing convolution on these values $f_s$ to obtain a matrix of $k \times (r-a+1) \times (c-b+1)$ numbers of convolution features.

Step S304: allocating the convolution features to a plurality of non-intersecting areas, and obtaining pooled convolution features based on the average or maximum feature of the non-intersecting areas.

After obtaining features through convolution, these features will be used to perform classification. Theoretically, all the extracted features can be used to train classifiers, such as softmax classifiers, but this is limited by computational amount. For example, for an image of 96*96 pixels, assuming that 400 features which are defined for a 8*8 input are trained and obtained, performing convolution on each feature and each image, convolution features of (96−8+1)*(96−8+1)=7921 dimensions are obtained. There are 400 features, so each example will obtain a convolution feature vector of 892*400=3,168,400 dimensions. It is very inconvenient to learn a classifier with more than 3 million feature inputs, and over-fitting is likely to appear.

In order to solve this problem, and considering that convolution utilizes the "static" property of an image, which also means that the useful features in an image area are very likely to be applicable in another area, therefore in order to describe large images, a natural ideal is to perform aggregated statistics on features at different positions, for example, the average (or maximum) value of a specific feature of an area in an image can be calculated. These summary statistical features not only have a much lower dimension (compared to all extracted features), but also improve the results (not prone to over-fit). This aggregating operation is called pooling, sometimes also called average pooling or maximum pooling (depending on the calculation method of pooling).

If a continuous range in an image is chosen as a pool area, and only features generated by a same (repeat) hidden unit is pooled, then these pooling units have a translational invariance property. This means that even when an image undergoes a small translation, it will produce a same (pooled) feature. In many tasks (such as target detection), it is preferable to get translation-invariant features, because even if an image undergoes a translation, the tag of an example (image) remains unchanged.

Formally, after obtaining convolution features that we have previously discussed, we need to determine the size of a pooling area (assuming $m \times n$) to pool our convolution features. Then, the convolution features are allocated to several non-intersecting areas of a size of $m \times n$, and then pooled convolution features are obtained using the average (or maximum) feature of these areas. These pooled features can be configured for classification.

Step S305: training a deep learning classifier based on the pooled convolution features through a back propagation algorithm and Softmax regression.

The idea of a back propagation algorithm is as follows: for a given example $x \times y$, a "forward conduction" computation is firstly performed to calculate all the activation values in a network, including output values of $h_{w,b(x)}$. Then, for each node i in the lth layer, its "residual" $\delta_i^{(l)}$ is calculated, which means how much effect this node produces on the residual of the final output. For the final output node, the gap between the activation value produced by a network and an actual value can be directly calculated and defined as $\delta_i^{(nl)}$ (the $n_l$ th represents the output layer). For a hidden unit, $\delta_i^{(l)}$ is calculated based on the weighted average values of residuals of nodes (the l+1 th-layer nodes), and these nodes take $a_i^{(l)}$ as inputs.

To sum up, the specific steps of a back propagation algorithm are as follows:

performing a forward conduction computation to obtain activation values of $L_2, L_3 \ldots$ to an output layer $L_{n_l}$ using a forward conduction formula.

for an output layer (the $n_l$ th-layer), calculating:

$$\delta^{(nl)} = -(y - a^{(nl)}) \cdot f'(z^{(nl)})$$

for various layers of $l = n_l - 1, n_l - 2, n_l - 3, \ldots, 2$, calculating:

$$\delta^{(l)} = ((W^{(l)})^T \delta^{(l+1)}) \cdot f'(z^{(l)})$$

calculating the partial derivative values eventually needed:

$$\nabla_{W^{(l)}} J(W,b;x,y) = \delta^{(l+1)}(a^{(l)})^T$$

$$\nabla_{b^{(l)}} J(W,b;x,y) = \delta^{(l+1)}$$

calculating the gradient of each parameter of a network:
calculating: $\Delta W^{(l)} := \Delta W^{(l)} + \nabla_{W^{(l)}} \cdot J(W, b; x, y)$
and calculating $\Delta b^{(l)} := \Delta b^{(l)} + \nabla_{b^{(l)}} \cdot J(W,b; x, y)$.
updating network parameters:

$$W^{(l)} = W^{(l)} - \alpha\left[\left(\frac{1}{m}\Delta W^{(l)}\right) + \lambda W^{(l)}\right]$$

$$b^{(l)} = b^{(l)} - \alpha\left[\frac{1}{m}\Delta b^{(l)}\right]$$

A Softmax regression model is a generalization of a logistic regression model in multi-classification problems, in which class tags y can take more than two values.

For a given test input x, a probability value p(y=j|x) is evaluated for each type j using a hypothesis function. That is to say, we want to estimate the probability of occurrence of each classification result of x. Thus, our hypothetical function will output a k dimensional vector (the sum of vector elements is 1) to represent the probability value of these k numbers of estimated values. Specifically, the form of a hypothetical function $h_\theta(x)$ is as follows:

$$h_\theta(x^{(i)}) = \begin{bmatrix} p(y^{(i)} = 1 | x^{(i)}; \theta) \\ p(y^{(i)} = 2 | x^{(i)}; \theta) \\ \dots \\ p(y^{(i)} = k | x^{(i)}, \theta) \end{bmatrix} = \frac{1}{\sum_{j=1}^{k} e^{\theta_j^T x^{(i)}}} \begin{bmatrix} e^{\theta_1^T x^{(i)}} \\ e^{\theta_2^T x^{(i)}} \\ \dots \\ e^{\theta_k^T x^{(i)}} \end{bmatrix}$$

wherein, $\theta_1, \theta_2, \dots, \theta_k \in \mathfrak{R}^{n+1}$ is parameters of the model. And finally the cost function is obtained as follows:

$$J(\theta) = -\frac{1}{m}\left[\sum_{i=1}^{m}\sum_{j=1}^{k} 1\{y^{(i)} = j\}\log\frac{e^{\theta_j^T x^{(i)}}}{\sum_{l=1}^{k} e^{\theta_l^T x^{(i)}}}\right]$$

There are no closed solutions for the above objective function, but the local optimum can be obtained by iteration using a gradient descent method:

$$\nabla_{\theta_j} J(\theta) = -\frac{1}{m}\sum_{i=1}^{m}[x^{(i)}(1\{y^{(i)} = j\} - p\{y^{(i)} = j | x^{(i)}; \theta\})]$$

Thus, the model parameters can be updated using the following formula:

$$\theta_j := \theta_j - \alpha \nabla_{\theta_j} J(\theta), j=1, \dots, k$$

It should be noted that, steps S303 to S305 describe a training process of a depth classifier, which can be understood as a model establishing process. In practical applications, the training of a classifier can be completed in advance before searching in an image to be searched, whereas in the solution of the present application, it is only needed to use this classifier to predict and obtain prediction results during searching.

Step S306: the deep learning classifier performing at least two levels of classification on the target.

wherein, σ is a sigmod type function, $W^{(1)}$ and $b^{(1)}$ are the weight and deviation between a visual layer unit and a hidden unit in a small size image sample, k is the number of features obtained by calculating $f_s$, the size of the target area image of the target is r×c.

Wherein, image addresses of a same classification in the image database are saved into a same table to form the tree classification index structure; a root node of the tree classification index structure stores the address of a first-level index table, a higher-level index table stores addresses of lower-level index tables, a final-level index table stores image addresses.

For each class, addresses of images of same type are saved into one same table according to the classification results, to form a tree classification index structure.

The root node saves a first-level index table of pedestrian, motor vehicle or non-motorized vehicle, and the table respectively stores addresses of second-level index tables of gender, vehicle brand, bicycle, electro mobile and so on, and the second-level index tables further save addresses of third-class index tables which save image addresses.

As for searching in an image, the type of a target is firstly identified using the above combined classifier, it is only needed to search among the images of leaf nodes in tree classification index rather than all the images, which saves searching time.

It should be noted that, step S306 is a step of classifying target type of a target in an image to be searched. In practical applications, classifying target type of a target in an image to be searched can be completed using a classifier trained based on a deep learning algorithm, this classifier can be trained in advanced before searching in an image to be searched.

Step S307: dividing a target area image corresponding to the target into a plurality of feature extraction areas, generating a corresponding feature for each feature extraction area, and synthesizing the corresponding features of all the feature extraction areas into a local feature of the target.

When extracting a local feature, a feature extraction area is automatically divided into blocks to generate a corresponding feature for each block. Finally features corresponding to all blocks are combined into a final feature.

Step S308: generating a gauss distribution random number matrix S of d×d; obtaining an orthogonal projection matrix U by performing a SVD decomposition algorithm $S=U\Lambda U^{-1}$ on S; forming a final orthogonal projection matrix p by taking the first $d_b$ rows of U.

Step S309: assigning a feature descriptor of the local feature to a bag of words with the smallest distance therefrom.

Step S310: performing projection calculation on the feature descriptor using the orthogonal projection matrix p.

Step S311: in each-dimensional projection component at the center of each bag of words, sorting a set of features belonging to this bag of words, and obtaining a median value of the sorted results as the binary code string to generate the first threshold value.

Step S312: generating a local feature code of the target, the local feature code being calculated as follows:

$$b(x) = (b_1(x), \dots, b_{d_b}(x))\ b_i(x) = \begin{cases} 1 & z_i > \tau_{q(x),i} \\ 0 & \text{otherwise} \end{cases};$$

wherein, $b_i(x)$ represents a current ith-dimensional binary local feature code, $z_i$ represents a current ith-dimensional local feature value, and $\tau_{q(x),i}$ represents a current ith-dimensional local feature threshold.

Steps S308 to S312 describe the specific steps of coding compression the obtained local features of an image, it should be noted that, the coding compression of local features of an image in an image database can be completed in advance.

Step S313: searching the image database for suspected images of the same classification with the target.

Step S314: filtering out, from the suspected images, images whose similarity with the basic features of the target is smaller than a second threshold.

The basic features (including a color feature, a texture feature and a contour feature) of a target are in the form of normalized vectors, and the similarity between two images is calculated by dot product:

$$similary = \sum_{i=0}^{D} x_i * y_i$$

During searching, if the similarity of an upper-layer feature of an image is smaller than a specified threshold, such as 0.2, then directly return a similarity of zero, and feature extraction and similarity judgment are not performed for the lower layer. That is to say, if the similarity of a color feature is less than a second threshold, no comparisons will be performed subsequently for texture feature and contour feature of the target. This mode of operation saves time of feature extraction and similarity comparison, and the procedure from course to fine ensures that similar images can be preserved for last and the dissimilar images can be screened out layer-by-layer, thereby saving the time for searching.

It should be noted that, the second threshold mentioned above can be a threshold set for color features, texture features and contour features among the basic features. In practical applications, it is also possible to set one threshold respectively for these three features to obtain three thresholds. These three thresholds can be identical or different, and can be reasonably configured by a person skilled in the art according to the specific situation in the practical application.

Step S315: comparing pre-stored local feature codes of the suspected images with the local feature code of the target, and outputting a suspected image with a similarity larger than a first threshold.

Step S316: sorting and outputting images in the subset of suspected images by similarity from high to low.

In summary, by locating a target in an image to be searched, performing at least two levels of classification on the target, generating a local feature code of the target, and searching according to the classification of the target when searching and sorting by similarity; by classifying the target, the searched target is model-matched in the same target classification, enhancing the searching accuracy and efficiency.

In practical applications, in case a deep learning classifier is pre-established, the embodiment of the method as shown in FIG. 3 can be simplified as the following steps:

(1). locating a target in an image to be searched;

(2). extracting basic features of the target, wherein the basic features include a color feature, a texture feature and a contour feature;

(3). performing at least two levels of classification on the target using the pre-established deep learning classifier;

(4). dividing a target area image corresponding to the target into a plurality of feature extraction areas, generating a corresponding feature for each feature extraction area, and synthesizing the corresponding features of all the feature extraction areas into a local feature of the target;

(5). generating a gauss distribution random number matrix S of d×d; obtaining an orthogonal projection matrix U by performing a SVD decomposition algorithm $S=U\Lambda U^{-1}$ on S; forming a final orthogonal projection matrix p by taking the first $d_b$ rows of U;

(6). assigning a feature descriptor of the local feature to a bag of words with the smallest distance therefrom;

(7). performing projection calculation on the feature descriptor using the orthogonal projection matrix p;

(8). in each-dimensional projection component at the center of each bag of words, sorting a set of features belonging to this bag of words, and obtaining a median value of the sorted results as the binary code string to generate a first threshold value;

(9). generating a local feature code of the target, the local feature code being calculated as follows:

$$b(x) = (b_1(x), \ldots, b_{d_b}(x)) \quad b_i(x) = \begin{cases} 1 & z_i > \tau_{q(x),i} \\ 0 & \text{otherwise} \end{cases};$$

wherein, $b_i(x)$ represents a current ith-dimensional binary local feature code, $z_i$ represents a current ith-dimensional local feature value, and $\tau_{q(x),i}$ represents a current ith-dimensional local feature threshold;

(10). searching the image database for suspected images of the same classification with the target;

(11). filtering out, from the suspected images, images whose similarity with the basic features of the target is smaller than a second threshold;

(12). comparing pre-stored local feature codes of the suspected images with the local feature code of the target, and outputting a suspected image with a similarity larger than a first threshold;

(13). sorting and outputting images in the subset of suspected images by similarity from high to low.

An embodiment of a device for searching a target in an image provided in the detailed description of the present application is described below. For the part which is not described in the searching device, reference can be made to the embodiments of the searching method since the embodiments of the searching device are implemented based on the embodiments of the searching method previously described.

Figure 4:
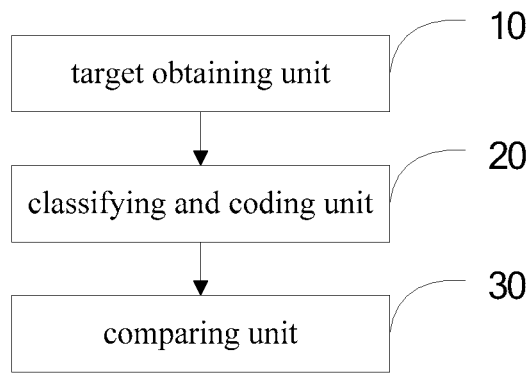
FIG. 4 is a structural block diagram of a first embodiment of a device for searching a target in an image provided in the detailed description of the present application.

Refer to FIG. 4, which is a structural block diagram of a first embodiment of a device for searching a target in an image provided in the detailed description of the present application. As shown, the searching device includes:

a target obtaining unit 10, configured for locating a target in an image to be searched;

a classifying and coding unit 20, configured for classifying the target and extracting a local feature of the target to generate a local feature code of the local feature;

a comparing unit 30, configured for searching an image database for suspected images of the same classification as the target through a tree classification index structure, comparing pre-stored local feature codes of the suspected images with the local feature code of the target, and outputting a suspected image with a similarity larger than a first threshold.

In summary, various functional components described above cooperate with each other, by locating a target in an image to be searched, performing at least two levels of classification on the target, generating a local feature code of the target, and searching according to the classification of the target when searching and sorting by similarity; by classifying the target, the searched target is model-matched in the same target classification, enhancing the searching accuracy and efficiency.

Figure 5:
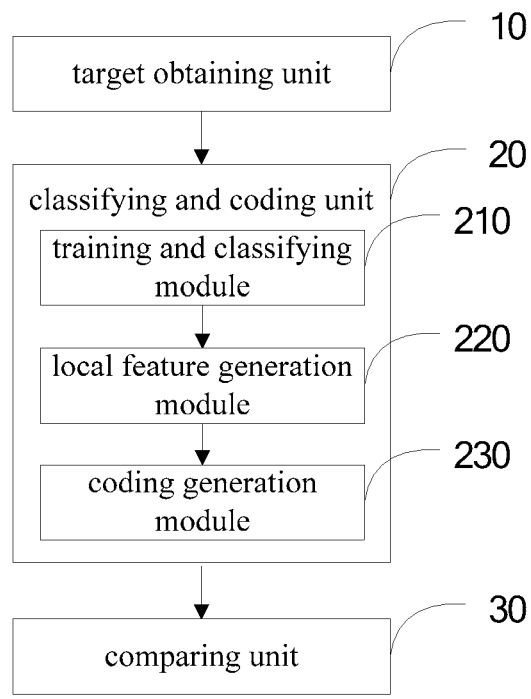
FIG. 5 is a structural block diagram of a second embodiment of a device for searching a target in an image provided in the detailed description of the present application.

Refer to FIG. 5, which is a structural block diagram of a second embodiment of a device for searching a target in an image provided in the detailed description of the present application. As shown, the searching device includes:

a target obtaining unit 10, configured for locating a target in an image to be searched;

a classifying and coding unit 20, configured for classifying the target and extracting a local feature of the target to generate a local feature code of the local feature;

a comparing unit 30, configured for searching an image database for suspected images of the same classification as the target through a tree classification index structure, comparing pre-stored local feature codes of the suspected images with the local feature code of the target, and outputting a suspected image with a similarity larger than a first threshold.

Wherein, the classifying and coding unit 20 includes:

a training and classifying module 210, configured for generating a deep learning classifier through training, wherein the deep learning classifier performing at least two levels of classification on the target;

a local feature generation module 220, configured for dividing a target area image corresponding to the target into a plurality of feature extraction areas, generating a corresponding feature for each feature extraction area, and synthesizing the corresponding features of all the feature extraction areas into a local feature of the target;

an coding generation module 230, configured for generating a local feature code of the target by performing coding compression on the local feature based on first-level classification model among the at least two levels of classification, the local feature code being a fixed-length binary code string.

In summary, various functional components described above cooperate with each other, by locating a target in an image to be searched, performing at least two levels of classification on the target, generating a local feature code of the target, and searching according to the classification of the target when searching and sorting by similarity; by classifying the target, the searched target is model-matched in the same target classification, enhancing the searching accuracy and efficiency.

Figure 6:
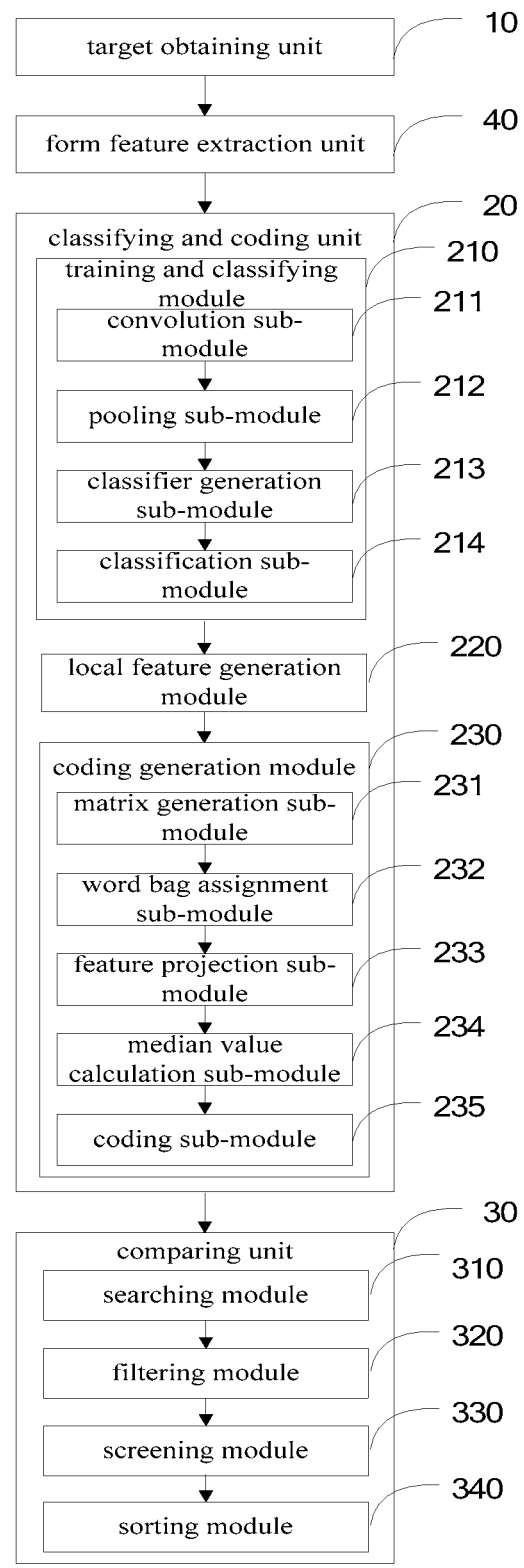
FIG. 6 is a structural block diagram of a third embodiment of a device for searching a target in an image provided in the detailed description of the present application.

Refer to FIG. 6, which is a structural block diagram of a third embodiment of a device for searching a target in an image provided in the detailed description of the present application. As shown, the searching device includes:

a target obtaining unit 10, configured for locating a target in an image to be searched;

a classifying and coding unit 20, configured for classifying the target and extracting a local feature of the target to generate a local feature code of the local feature;

a comparing unit 30, configured for searching an image database for suspected images of the same classification as the target through a tree classification index structure, comparing pre-stored local feature codes of the suspected images with the local feature code of the target, and outputting a suspected image with a similarity larger than a first threshold.

Wherein, the classifying and coding unit 20 includes:

a training and classifying module 210, configured for generating a deep learning classifier through training, wherein the deep learning classifier performing at least two levels of classification on the target;

a local feature generation module 220, configured for dividing a target area image corresponding to the target into a plurality of feature extraction areas, generating a corresponding feature for each feature extraction area, and synthesizing the corresponding features of all the feature extraction areas into a local feature of the target;

an coding generation module 230, configured for generating a local feature code of the target by performing coding compression on the local feature based on first-level classification model among the at least two levels of classification, the local feature code being a fixed-length binary code string.

The training and classifying module 210 includes:

a convolution sub-module 211, configured for extracting image samples $x_s$ of a small size a×b from target area images of the target, and calculating a corresponding value $f_s=\sigma(W^{(1)}x_s+b^{(1)})$ for each small size image sample, performing convolution on all $f_s$ to obtain a matrix of k×(r−a+1)×(c−b+1) numbers of convolution features;

a pooling sub-module 212, configured for allocating the convolution features into a plurality of non-intersecting areas, and obtaining pooled convolution features based on the average or maximum feature of the non-intersecting areas;

a classifier generation sub-module 213, configured for generating a deep learning classifier based on the pooled convolution features by training through a back propagation algorithm and Softmax regression;

a classification sub-module 214, used to the deep learning classifier for performing at least two levels of classification on the target;

wherein, σ is a sigmod type function, $W^{(1)}$ and $b^{(1)}$ are the weight and deviation between a visual layer unit and a hidden unit in a small size image sample, k is the number of features obtained by calculating $f_s$, the size of the target area image is r×c.

Wherein, image addresses of a same classification in the image database are saved into a same table to form a tree classification index structure; a root node of the tree classification index structure stores the address of a first-level index table, a higher-level index table stores addresses of lower-level index tables, a final-level index table stores image addresses.

Wherein, the coding generation module 230 includes:

a matrix generation sub-module 231, configured for generating a gauss distribution random number matrix S of d×d, obtaining an orthogonal projection matrix U by performing a SVD decomposition algorithm $S=U\Lambda U^{-1}$ on S, forming a final orthogonal projection matrix p by taking the first $d_b$ rows of U;

a word bag assignment sub-module 232, configured for assigning a feature descriptor of a local feature to a bag of words with the smallest distance therefrom;

a feature projection sub-module 233, configured for projection calculating the feature descriptors using the orthogonal projection matrix p;

a median value calculation sub-module 234, configured for, in each-dimensional projection component at the center of each bag of words, sorting a set of features belonging to this bag of words, and obtaining a median value of the sorted results as a binary code string to generate a first threshold value;

a coding sub-module 235, configured for generating a local feature code of the target, the local feature code being calculated as follows:

$$b(x) = (b_1(x), \ldots, b_{d_b}(x)) \quad b_i(x) = \begin{cases} 1 & z_i > \tau_{q(x),i} \\ 0 & \text{otherwise} \end{cases};$$

wherein, $b_i(x)$ represents a current ith-dimensional binary local feature code, $z_i$ represents a current ith-dimensional local feature value, and $\tau_{q(x),i}$ represents a current ith-dimensional local feature threshold.

Wherein, the device further includes:

a basic feature extraction unit 40, configured for extracting basic features of the target, wherein the basic features include a color feature, a texture feature and a contour feature;

The comparing unit 30 includes:

a searching module 310, configured for searching the image database for suspected images of the same classification with the target;

a filtering module 320, configured for filtering out, from the suspected images, images whose similarity with the basic features of the target is smaller than a second threshold;

a screening module 330, configured for comparing local feature codes of the remaining suspected images with the local feature code of the target to obtain a subset of suspected images whose similarity is larger than a first threshold;

a sorting module 340, configured for sorting and outputting images in the subset of suspected images by similarity from high to low.

In summary, various functional components described above cooperate with each other, by locating a target in an image to be searched, performing at least two levels of classification on the target, generating a local feature code of the target, and searching according to the classification of the target when searching and sorting by similarity; by classifying the target, the searched target is model-matched in the same target classification, enhancing the searching accuracy and efficiency.

To achieve the above purposes, embodiments of the present application further provide a storage medium, wherein, the storage medium is used to store an application program, the application program is used to implement the method for searching a target in an image provided by the embodiments of the present application when being executed.

Wherein, the method for searching a target in an image provided in the present application includes:

locating a target in an image to be searched;

classifying the target and extracting a local feature of the target to generate a local feature code of the local feature;

searching an image database for suspected images of the same classification as the target through a tree classification index structure, comparing pre-stored local feature codes of the suspected images with the local feature code of the target, and outputting a suspected image with a similarity larger than a first threshold.

To achieve the above purposes, embodiments of the present application further provide an application program, wherein, the application program is used to implement the method for searching a target in an image provided by the embodiments of the present application when being executed.

Wherein, the method for searching a target in an image provided in the present application includes:

locating a target in an image to be searched;

classifying the target and extracting a local feature of the target to generate a local feature code of the local feature;

searching an image database for suspected images of the same classification as the target through a tree classification index structure, comparing pre-stored local feature codes of the suspected images with the local feature code of the target, and outputting a suspected image with a similarity larger than a first threshold.

To achieve the above purposes, embodiments of the present application further provide an apparatus for searching a target in an image, wherein the apparatus includes:

a processor, a memory, a communication interface and a bus;

wherein, the processor, the memory and the communication interface are connected and communicated with each other via the bus;

the processor can be a central processing unit (CPU) or an application specific integrated circuit (ASIC), or is configured as one or more integrated circuits implementing embodiments of the present application;

the memory stores executable program code, and can include a high speed RAM memory, or non-volatile memory, such as at least one disk memory;

the processor executes a program corresponding to executable program code by reading the executable program code stored in the memory, for:

locating a target in an image to be searched;

classifying the target and extracting a local feature of the target to generate a local feature code of the local feature;

searching an image database for suspected images of the same classification as the target through a tree classification index structure, comparing pre-stored local feature codes of the suspected images with the local feature code of the target, and outputting a suspected image with a similarity larger than a first threshold.

The specific implementations of various steps described above can refer to the implementations of corresponding steps in the above embodiments, and will not be repeated here.

The embodiments described above are just preferable embodiments of the present application, and not indented to limit the present application. Any modifications, alternatives, improvements or the like within the spirit and principle of the present application shall be included in the protection scope of the present application.

The invention claimed is:

1. A method for searching a target in an image, wherein the method comprises:
    locating a target in an image to be searched;
    classifying the target and extracting a local feature of the target to generate a local feature code of the local feature, comprising:
        generating a deep learning classifier through training, wherein the deep learning classifier performing at least two levels of classification on the target;
        dividing a target area image corresponding to the target into a plurality of feature extraction areas, generating a corresponding feature for each feature extraction area, and synthesizing the corresponding features of all the feature extraction areas into a local feature of the target;
        extracting image samples $x_s$ of a small size a×b from the target area image of the target, and calculating a corresponding value $f_s = \sigma(W^{(1)} x_s + b^{(1)})$ for each image sample of a small size, performing convolution on all $f_s$ to obtain a matrix of $k\times(r-a+1)\times(c-b+1)$ convolution features;

allocating the convolution features to a plurality of non-intersecting areas, and obtaining pooled convolution features based on the average or maximum feature of the non-intersecting areas;

generating a deep learning classifier based on the pooled convolution features by training through a back propagation algorithm and Softmax regression; wherein, $\sigma$ is a sigmod type function, $W^{(1)}$ and $b^{(1)}$ are the weight and deviation between a visual layer unit and a hidden unit in an image sample of a small size, k is the number of features obtained by calculating $f_s$, the size of the target area image is $r\times c$;

searching an image database for suspected images of the same classification as the target through a tree classification index structure, comparing pre-stored local feature codes of the suspected images with the local feature code of the target, and outputting a suspected image with a similarity larger than a first threshold.

2. The method of claim 1, wherein, classifying the target and extracting a local feature of the target to generate a local feature code of the local feature comprising:

generating a local feature code of the target by performing coding compression on the local feature based on first-level classification model among the at least two levels of classification, the local feature code being a fixed-length binary code string.

3. The method of claim 1, wherein, image addresses of a same classification in the image database are saved into a same table to form the tree classification index structure;

a root node of the tree classification index structure stores the address of a first-level index table, a higher-level index table stores addresses of lower-level index tables, a final-level index table stores image addresses.

4. The method of claim 2, wherein, the step of generating a local feature code of the target by performing coding compression on the local feature based on first-level classification model among the at least two levels of classification comprises:

generating a gauss distribution random number matrix S of $d\times d$;

obtaining an orthogonal projection matrix U by performing a SVD decomposition algorithm $S=U\Lambda U^{-1}$ on S;

forming a final orthogonal projection matrix p by taking the first $d_b$ rows of U;

assigning a feature descriptor of the local feature to a bag of words with the smallest distance therefrom;

performing projection calculation on the feature descriptor using the orthogonal projection matrix p;

in each-dimensional projection component at the center of each bag of words, sorting a set of features belonging to this bag of words, and obtaining a median value of the sorted results as a binary code string to generate a first threshold;

generating a local feature code of the target, the local feature code being calculated as follows:

$$b(x)=(b_1(x),\ldots,b_{d_b}(x))\ b_i(x)=\begin{cases}1 & z_i>\tau_{q(x),i}\\ 0 & \text{otherwise}\end{cases};$$

wherein, $b_i(x)$ represents a current ith-dimensional binary local feature code, $z_i$ represents a current ith-dimensional local feature value, and $\tau_{q(x),i}$ represents a current ith-dimensional local feature threshold.

5. The method of claim 1, wherein, before the step of classifying the target and extracting a local feature of the target to generate a local feature code of the local feature, the method further comprises:

extracting basic features of the target, the basic features comprise a color feature, a texture feature and a contour feature.

6. The method of claim 1, wherein, the step of comparing pre-stored local feature codes of the suspected images with the local feature code of the target and outputting a suspected image with a similarity larger than a first threshold further comprises:

searching the image database for suspected images of the same classification with the target;

filtering out, from the suspected images, images whose similarity with basic features of the target is smaller than a second threshold;

comparing local feature codes of the remaining suspected images with the local feature code of the target to obtain a subset of suspected images whose similarity is larger than a first threshold;

sorting and outputting images in the subset of suspected images by similarity from high to low.

7. A non-transitory storage medium, wherein the storage medium is used to store an application program, the application program is used to implement the method for searching a target in an image of any one of claims 1, 2 and 3-6 when being executed.

8. An image searching apparatus, wherein the apparatus comprises a processor, a communication interface, a memory and a communication bus; wherein, the processor, the memory and the communication interface are connected and communicated with each other via the bus;

the memory stores executable program code;

the processor executes a program corresponding to the executable program code by reading the executable program code stored in the memory, for:

locating a target in an image to be searched;

classifying the target and extracting a local feature of the target to generate a local feature code of the local feature, comprising;

generating a deep learning classifier through training, wherein the deep learning classifier performing at least two levels of classification on the target;

dividing a target area image corresponding to the target into a plurality of feature extraction areas, generating a corresponding feature for each feature extraction area, and synthesizing the corresponding features of all the feature extraction areas into a local feature of the target, extracting image samples $x_s$ of a small size $a\times b$ from the target area image of the target, and calculating a corresponding value $f_s=\sigma(W^{(1)}x_s+b^{(1)})$ for each image sample of a small size, performing convolution on all $f_s$ to obtain a matrix of $k\times(r-a+1)\times(c-b+1)$ convolution features;

allocating the convolution features to a plurality of non-intersecting areas, and obtaining pooled convolution features based on the average or maximum feature of the non-intersecting areas;

generating a deep learning classifier based on the pooled convolution features by training through a back propagation algorithm and Softmax regression;

wherein, σ is a sigmod type function, $W^{(1)}$ and $b^{(1)}$ are the weight and deviation between a visual layer unit and a hidden unit in an image sample of a small size, k is the number of features obtained by calculating $f_s$, the size of the target area image is r×c;

searching an image database for suspected images of the same classification as the target through a tree classification index structure, comparing pre-stored local feature codes of the suspected images with the local feature code of the target, and outputting a suspected image with a similarity larger than a first threshold.

9. The apparatus of claim 8, wherein the processor further executes the program for generating a local feature code of the target by performing coding compression on the local feature based on first-level classification model among the at least two levels of classification, the local feature code being a fixed-length binary code string.

10. The apparatus of claim 8, wherein, image addresses of a same classification in the image database are saved into a same table to form the tree classification index structure;

a root node of the tree classification index structure stores the address of a first-level index table, a higher-level index table stores addresses of lower-level index tables, a final-level index table stores image addresses.

11. The device of claim 9, wherein the processor further executes the program for generating a gauss distribution random number matrix S of d×d, obtaining an orthogonal projection matrix U by performing a SVD decomposition algorithm $S=U\Lambda U^{-1}$ on S; forming a final orthogonal projection matrix p by taking the first $d_b$ rows of U;

assigning a feature descriptor of the local feature to a bag of words with the smallest distance therefrom;

a feature projection sub-module, configured for performing projection calculation on the feature descriptor using the orthogonal projection matrix p;

in each-dimensional projection component at the center of each bag of words, sorting a set of features belonging to this bag of words, and obtaining a median value of the sorted results as a binary code string to generate a first threshold value;

generating a local feature code of the target, the local feature code being calculated as follows:

$$b(x) = (b_1(x), \ldots, b_{d_b}(x))\ b_i(x) = \begin{cases} 1 & z_i > \tau_{q(x),i} \\ 0 & \text{otherwise} \end{cases};$$

wherein, $b_i(x)$ represents a current ith-dimensional binary local feature code, $z_i$ represents a current ith-dimensional local feature value, and $\tau_{q(x),i}$ represents a current ith-dimensional local feature threshold.

12. The apparatus of claim 8, wherein, the processor further executes the program for extracting basic features of the target, the basic features comprise a color feature, a texture feature and a contour feature.

13. The apparatus of claim 8, wherein the processor further executes the program for:

searching the image database for suspected images of the same classification with the target;

filtering out, from the suspected images, images whose similarity with basic features of the target is smaller than a second threshold;

comparing local feature codes of the remaining suspected images with the local feature code of the target to obtain a subset of suspected images whose similarity is larger than a first threshold;

sorting and outputting images in the subset of suspected images by similarity from high to low.

\* \* \* \* \*